United States Patent
Makita et al.

(10) Patent No.: US 9,493,096 B2
(45) Date of Patent: Nov. 15, 2016

(54) VEHICLE SEAT INCLUDING RECLINING APPARATUS

(71) Applicant: TACHI-S CO., LTD., Tokyo (JP)

(72) Inventors: Naoyuki Makita, Tokyo (JP); Ukyo Miyazawa, Tokyo (JP); Daisuke Fujita, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 14/593,962

(22) Filed: Jan. 9, 2015

(65) Prior Publication Data

US 2015/0202995 A1      Jul. 23, 2015

(30) Foreign Application Priority Data

Jan. 22, 2014   (JP) .................................. 2014-009494

(51) Int. Cl.
*B60N 2/20*   (2006.01)

(52) U.S. Cl.
CPC ...................... *B60N 2/20* (2013.01)

(58) Field of Classification Search
CPC ................ B60N 2/20; B60N 2/22; B60N 2/58
USPC ......................... 297/361.1, 452.38
See application file for complete search history.

(56) References Cited

U.S. PATENT DOCUMENTS

| 4,445,709 A | * | 5/1984 | Bost .................... A44B 11/2557 280/801.1 |
| 5,947,757 A | * | 9/1999 | Ishii .................. H01R 13/62905 439/157 |
| 6,267,443 B1 | * | 7/2001 | Kurita et al. .................. 297/374 |

FOREIGN PATENT DOCUMENTS

| JP | 07-236535 A | 9/1995 |
| JP | 11-115576 A | 4/1999 |
| JP | 2012-040920 A | 3/2012 |
| JP | 2012-126246 A | 7/2012 |
| JP | 2015-137003 A | 7/2015 |

* cited by examiner

*Primary Examiner* — Milton Nelson, Jr.
(74) *Attorney, Agent, or Firm* — McGinn IP Law Group, PLLC (57) ABSTRACT

A vehicle seat having a seat cushion obtained by covering a cushion-side frame with a trim cover, a seat back obtained by covering a back-side frame with a trim cover, and a reclining apparatus for making it possible to adjust the angle of tilt of the seat back with respect to the seat cushion. The reclining apparatus has a return spring provided on the outside of the frames, a locking mechanism for putting the frames into a locked state or an unlocked state, and an operation lever for switching the state of the locking mechanism. An outside surface of the return spring is covered by the operation lever, and the hazard presented by the return spring is reduced.

17 Claims, 6 Drawing Sheets

VEHICLE SEAT INCLUDING RECLINING APPARATUS

BACKGROUND OF THE INVENTION

1. Field of the Invention

The present invention relates to a vehicle seat provided with a reclining apparatus.

2. Description of the Related Art

Vehicle seats of such description typically have a seat cushion for a person to place their buttocks thereon, and a seat back for a person to rest their back thereagainst. The reclining apparatus is a device that makes it possible to adjust the angle by which the seat back is tilted with respect to the seat cushion.

PATENT CITATION 1

A conventionally known example of a reclining apparatus of such description is disclosed in Patent Citation 1 (Japanese Patent Laid-Open Publication No. 2012-126246). This conventional reclining apparatus comprises a return spring for urging the seat back towards the seat cushion (i.e., in a forward-tilting direction), a seat-back-locking device, and an operation lever for switching the locking device between a locked state and an unlocked state.

The locked state is a state in which the seat back and the seat cushion are integrally linked so that no relative movement is possible. The unlocked state is a state in which the seat back is capable of freely pivoting with respect to the seat cushion. The vehicle occupant can adjust the tilt angle of the seat back by operating the operation lever to put the locking device into an unlocked state.

In the reclining apparatus of Patent Citation 1, the return spring is provided on the outside of both a back-side frame, which is a skeleton structure of the seat back, and a cushion-side frame, which is a skeleton structure of the seat cushion. In this conventional reclining apparatus, since the return spring is provided on the outside of the frames, there is a risk of the return spring striking and injuring a person. Specifically, in the reclining apparatus of Patent Citation 1, a measure to prevent the hazardous return spring from protruding outwards, such as covering the return spring using a plastic cover member or a similar element, is necessary.

PATENT CITATION 2

A conventionally known example of a reclining apparatus of the above description is disclosed in Patent Citation 2 (Japanese Patent Laid-Open Publication No. H11-115576). In this conventional reclining apparatus, using numerals used in the document for description, a return spring (50) is provided on the outside of a seat (i.e., outside of frames). This return spring (50) is covered by a finisher cover (A). Covering the return spring (50) by a finisher cover eliminates the hazard presented by the return spring. However, in the reclining apparatus disclosed in Patent Citation 2, a problem is presented in that providing the finisher cover results in an increase in cost.

PATENT CITATION 3

A conventionally known example of a reclining apparatus of above description is disclosed in Patent Citation 3 (Japanese Patent Laid-Open Publication No. H07-236535). In this conventional reclining apparatus, using numerals used in the document for description, a return spring (46) is provided on the inside of a seat frame. Since the return spring is provided on the inside of the frame, in the reclining apparatus disclosed in Patent Citation 3, the hazard presented by the return spring is eliminated.

However, in this conventional reclining apparatus, since the return spring is provided on the inside of the frame, a problem is presented in that when the vehicle is rear-ended by another vehicle when the occupant is seated on the seat, the amount by which the occupant is pushed into the seat back by an inertial force is kept low by the presence of the return spring. Measures such as expanding the gap between the left and right frames are necessary to eliminate this problem.

SUMMARY OF THE INVENTION

The present invention was contrived in view of the above problems with conventional devices, and a first object of the present invention is to provide a return spring on the outside of frames to essentially expand a space region within the frame, and make it possible to ensure that the amount by which an occupant can be pressed into a seat back during a rear-end collision is sufficient.

A second object of the present invention is to obviate the need to use a finisher and thereby reduce cost and reduce the size of the overall shape of the device.

A vehicle seat according to the present invention is:

a vehicle seat comprising a seat cushion obtained by covering a cushion-side frame with a trim cover (i.e., a skin), a seat back obtained by covering a back-side frame with a trim cover, and a reclining apparatus for linking the cushion-side frame and the back-side frame so as to make it possible to adjust the angle of tilt of the seat back with respect to the seat cushion, wherein the reclining apparatus comprises a return spring provided on the outside of the cushion-side frame and the back-side frame and adapted to urge the seat back in a forward-tilting direction;

a locking mechanism capable of assuming a locked state in which the relative positions of the cushion-side frame and the back-side frame are locked and an unlocked state in which the back-side frame is capable of freely pivoting with respect to the cushion-side frame; and an operation lever for switching the state of the locking mechanism between the locked state and the unlocked state; and an outside surface of the return spring is covered by the operation lever.

In the present invention, the return spring is provided on the outside of the cushion-side frame and the back-side frame. If, instead of the above structure, the return spring is disposed on the inside of both of the frames, when the vehicle in which the occupant is seated on the seat is rear-ended by another vehicle, the amount by which the occupant is pushed into the seat back by an inertial force is restricted due to the obstruction caused by the return spring positioned on the inside of the frames. In such an instance, there is an increased likelihood of the occupant suffering whiplash.

In contrast, in the present embodiment, the seat return spring is provided on the outside of both the back-side side frame and the cushion-side side frame. Therefore, the seat return spring does not obstruct the occupant from being pushed into the seat back. The occupant is thereby allowed to be pushed into the seat back by a significant amount in an instance such as that of a rear-ending by another vehicle, and as a result, is less likely to suffer whiplash.

On the other hand, providing the seat return spring on the outside of both of the back-side side frame and the cushion-side side frame results in the return spring projecting significantly from the frame, increasing the likelihood of the return spring striking and injuring a person. In other words, the hazard may be increased. However, in the present embodiment, the return spring is covered by the operation lever, preventing the hazard from increasing.

Although a possible method for preventing the hazard from increasing due to the presence of a projecting member such as the return spring is to cover the projecting member using a finisher formed from a hard member such as plastic, in such a case, the need to use a finisher, which is a dedicated member, may result in an increase in cost of the reclining apparatus or the vehicle seat or an increase in the overall size of the reclining apparatus or the vehicle seat. In contrast, covering the return spring, which is a projecting member, using an operation lever, which is a necessary constituent element of the reclining apparatus, as in the present invention obviates the need for a dedicated finisher, making it possible to prevent the cost from increasing and the size of the device from increasing.

In the vehicle seat according to the present invention, the operation lever may have a portion covering a side surface of the return spring. This configuration makes it possible to increase the area covering the return spring, and therefore further reduce the hazard presented by the return spring.

The vehicle seat according to the present invention may have a linking rod for pivotally supporting each of the cushion-side frame and the back-side frame. The return spring may be a spiral spring shaped as a spiral around a center line of the linking rod. The operation lever may be a lever extending radially from the center line of the linking rod and a lever that turns within a predetermined angular range about the center line. The operation lever may cover the outside surface of the return spring in a portion corresponding to the turning center of the operation lever, centered around the center line.

According to this aspect of the invention, the configuration covering the return spring can be formed to a simple and compact shape. In addition, since the return spring has a substantially circular shape enclosing the center line of the linking rod and the portion at the turning center of the operation lever, centered around the center line of the linking rod, it is possible to cover the outside surface of the return spring with the operation lever in a stable manner at all times, irrespective of the position of the operation lever in terms of the angle of turn about the turning center line.

In the vehicle seat according to the present invention, the portion of the operation lever covering the side surface of the return spring is a ring-shaped projecting piece enclosing the center line of the linking rod. According to this configuration, it is possible to ensure that the side surface of the return spring is covered by the operation lever in a stable manner, irrespective of the tilt angle position of the operation lever.

In the vehicle seat according to the present invention, an inside end of the return spring can be fixed to a protruding piece projecting outwards from the cushion-side frame, and an outside end of the return spring can be fixed to a protruding piece projecting outwards from the back-side frame. Both of the protruding pieces project to the outside of the frame, and may present a hazard to people if no measure is taken. However, in the present invention, the protruding pieces are covered by a covering member, reducing the hazard risk.

EFFECT OF THE INVENTION (1) According to a vehicle seat of the present invention, a return spring is provided on the outside of frames, making it possible to essentially increase the size of the space region in the frames. As a result, it is possible to ensure that the amount by which the occupant can be pushed into the seat back during a rear-end collision is sufficient, making it possible to reduce the likelihood of whiplash.

(2) Providing the return spring to the outside of the frames as described above presents a problem of an increased risk of the return spring striking and injuring a person (i.e., an increased hazard). A possible method for reducing this hazard is a configuration in which the return spring, which is a projecting member, is covered by a dedicated finisher. However, using such a dedicated finisher presents a problem of increasing cost and increasing size of the device profile. In contrast, in the vehicle seat according to the present invention, the hazard presented by the return spring is reduced by covering the return spring, which is a projecting member, using an operation lever, which is a necessary constituent element of the reclining apparatus. Therefore, it is possible to minimize cost and prevent the size of the reclining apparatus or the vehicle seat from increasing, contrary to a case in which a dedicated finisher is used.

DESCRIPTION OF THE PREFERRED EMBODIMENTS

A vehicle seat according to the present invention will now be described with reference to an embodiment. It shall be apparent that the present invention is not limited to this embodiment. In the drawings accompanying the specification herein, constituent elements may be represented at scales that differ from reality in order to clearly illustrate characteristic portions.

(Vehicle Seat)

Figure 1:
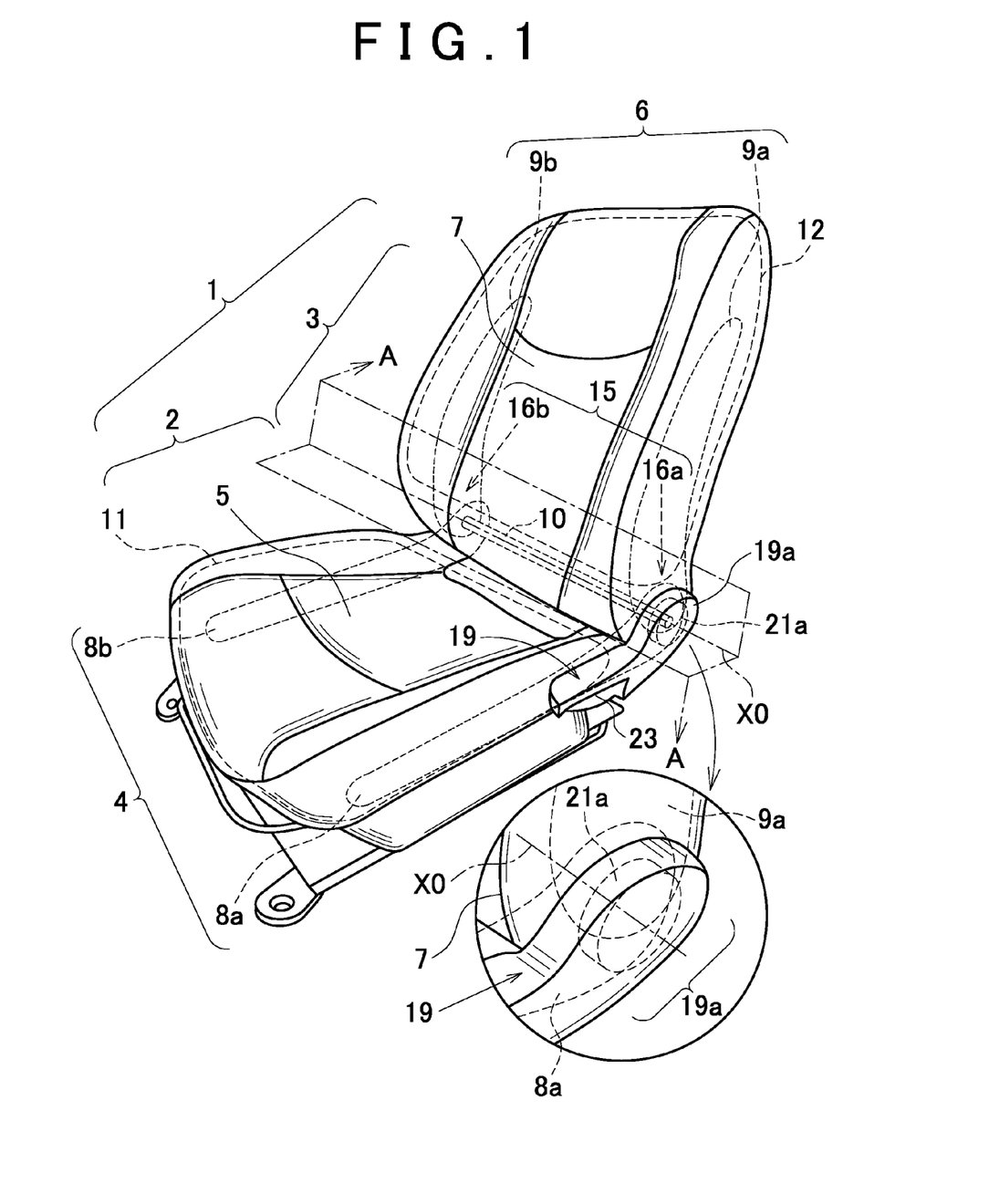
FIG. 1 is a perspective view showing a state in which an embodiment of the vehicle seat according to the present invention is viewed from one diagonal direction.
Figure 2:
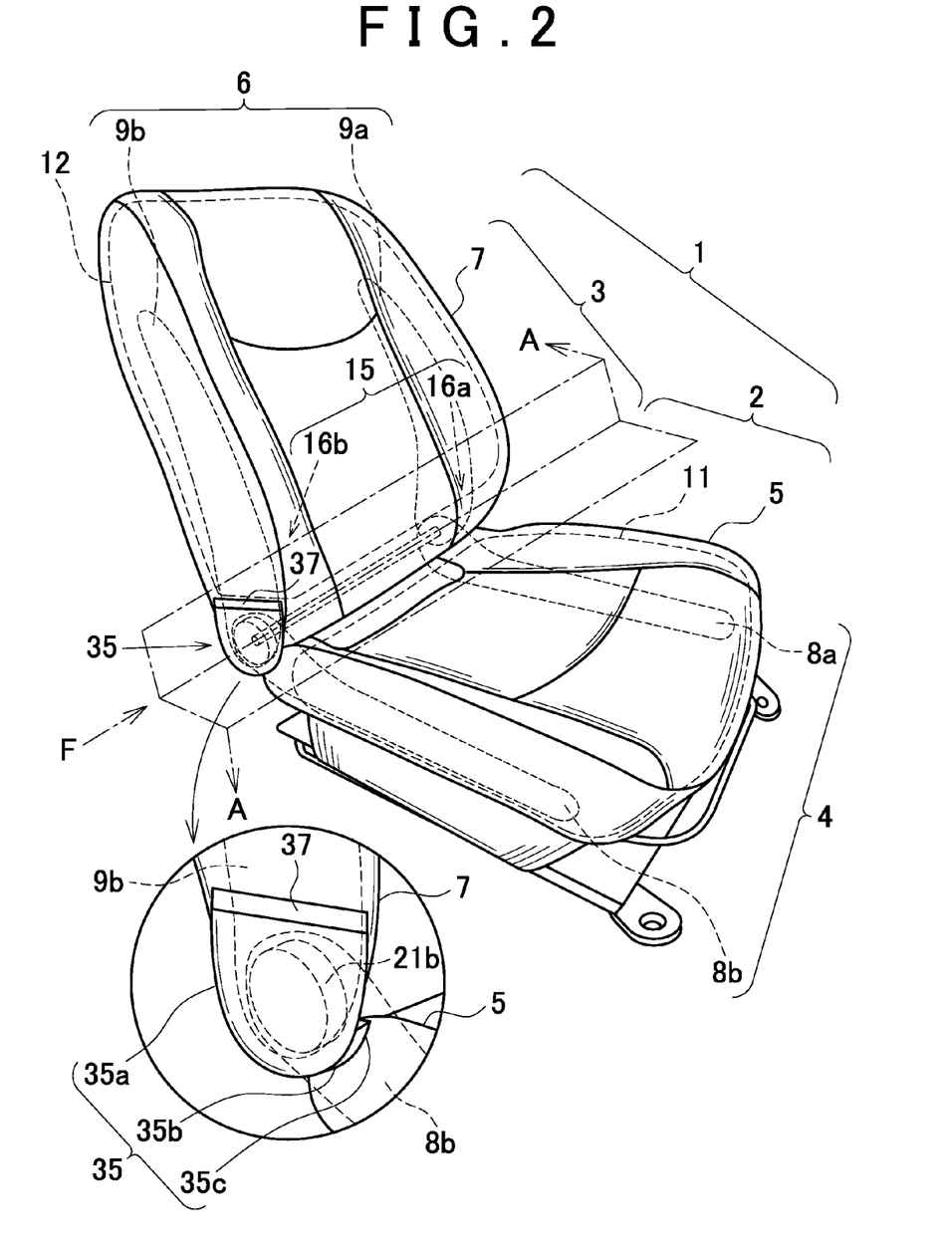
FIG. 2 is a perspective view showing a state in which the vehicle seat in FIG. 1 is viewed from another diagonal direction.
Figure 3:
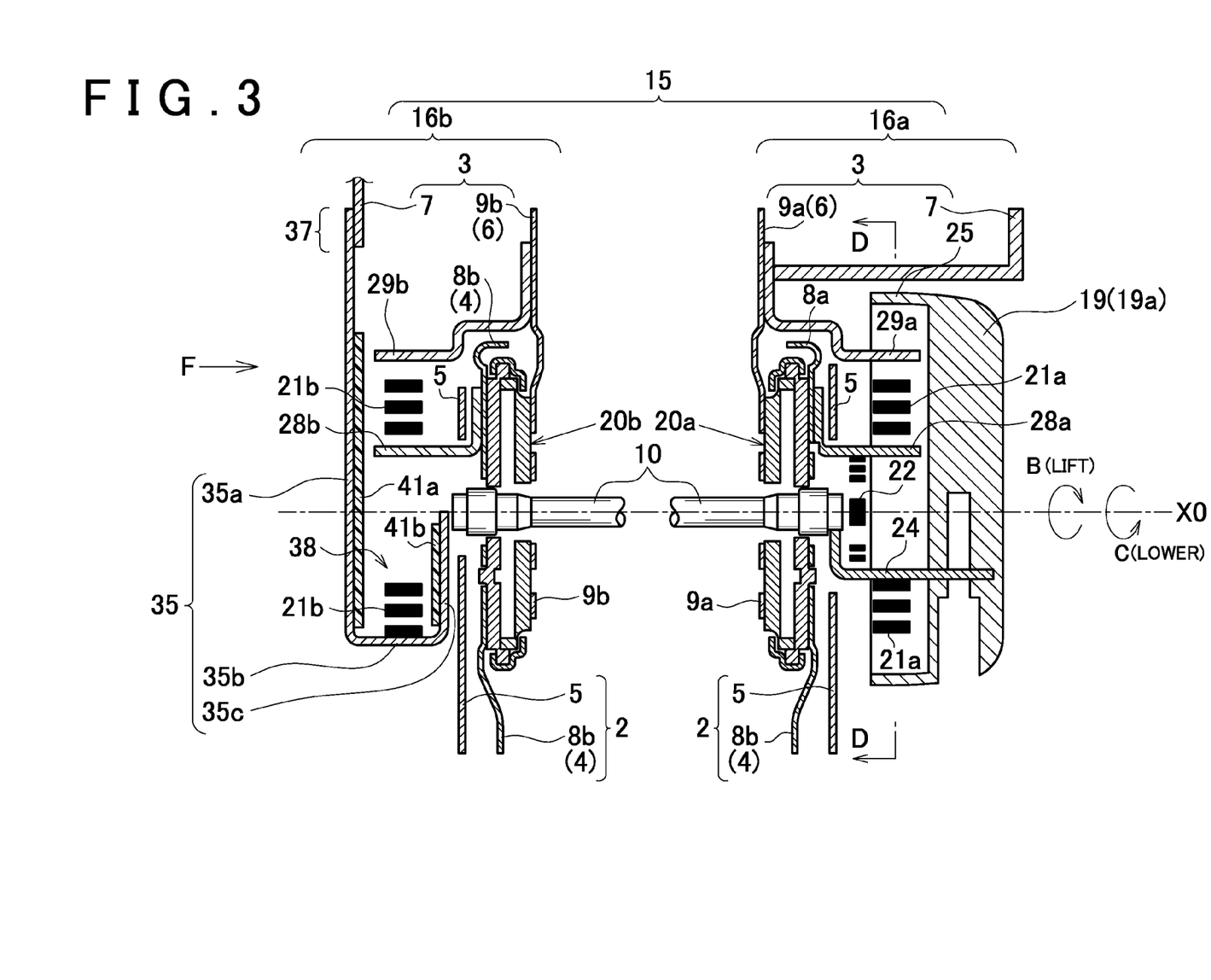
FIG. 3 is a cross-section view showing an embodiment of the reclining apparatus taken along the line A-A in FIGS. 1 and 2.

FIG. 1 shows a state in which a vehicle seat 1 is viewed from the diagonally forward right. FIG. 2 shows a state in which the vehicle seat 1 is viewed from the diagonally forward left. FIG. 3 shows a reclining apparatus 15 viewed along the line A-A in FIGS. 1 and 2. In FIGS. 1 and 2, the vehicle seat 1 has a seat cushion 2 for a person to place their buttocks thereon, and a seat back 3 for a person to rest their back thereagainst.

The seat cushion 2 has a cushion frame 4. A pad 11 is provided around the cushion frame 4. The seat cushion 2 is formed by covering the cushion frame 4 and the pad 11 using a trim cover 5 for seat cushion (i.e., a skin 5 for seat cushion, referred to as a cushion trim cover 5).

The seat back 3 has a back frame 6. A pad 12 is provided around the back frame 6. The seat back 3 is formed by covering the back frame 6 and the pad 12 using a trim cover 7 for seat back (i.e., a skin 7 for seat back, referred to as a back trim cover 7). The trim covers (i.e., skins) 5, 7 are formed, e.g., from a fabric, hide, leather, synthetic leather, a cloth, or another material. The pads 11, 12 are formed by molding into a predetermined shape using, e.g., a urethane foam material.

The cushion frame 4 is formed by assembling a large number of frame components; from among the components, only side frames 8a, 8b are shown in FIG. 1. The back frame 6 is also formed by assembling a large number of frame components, but only side frames 9a, 9b are shown in FIG. 1.

The back-side side frame 9a and the cushion-side side frame 8a are linked by a locking mechanism 20a so as to be capable of pivoting in relation to each other as shown in FIG. 3. The back-side side frame 9b and the cushion-side side frame 8b are linked by a locking mechanism 20b so as to be capable of pivoting in relation to each other.

The left and right locking mechanisms 20a, 20b are linked by a linking rod 10. Since the back-side side frames 9a, 9b are capable of pivoting relative to the cushion-side side frames 8a, 8b about the center of rotation of the linking rod 10. Therefore, the tilt angle of the seat back 3 can be adjusted using this pivoting motion.

(Reclining Apparatus)

The reclining apparatus 15 is a device for adjusting the tilt angle of the seat back 3 (i.e., the angle of the seat back 3 with respect to the seat cushion 2). In FIG. 3, the reclining apparatus 15 has an operation-lever-side reclining mechanism 16a and a non-operation-lever-side reclining mechanism 16b. The operation-lever-side reclining mechanism 16a is provided at one end of the linking rod 10. The non-operation-lever-side reclining mechanism 16b is provided to the other end of the linking rod 10.

The linking rod 10 is linked to the operation-lever-side reclining mechanism 16a and the non-operation-lever-side reclining mechanism 16b so that the operation-lever-side reclining mechanism 16a and the non-operation-lever-side reclining mechanism 16b rotate in synchronization. The linking rod 10 rotates about the centers of rotation of the reclining mechanisms 16a, 16b.

(Operation-Lever-Side Reclining Mechanism)

In FIG. 3, the operation-lever-side reclining mechanism 16a has an operation lever 19, a locking mechanism 20a which is a reclining device, a seat return spring 21a formed by a spiral spring shaped so as to spiral around a center line X0 of the linking rod 10, and a lever return spring 22 formed by another spiral spring centered around the linking rod 10.

Figure 4:
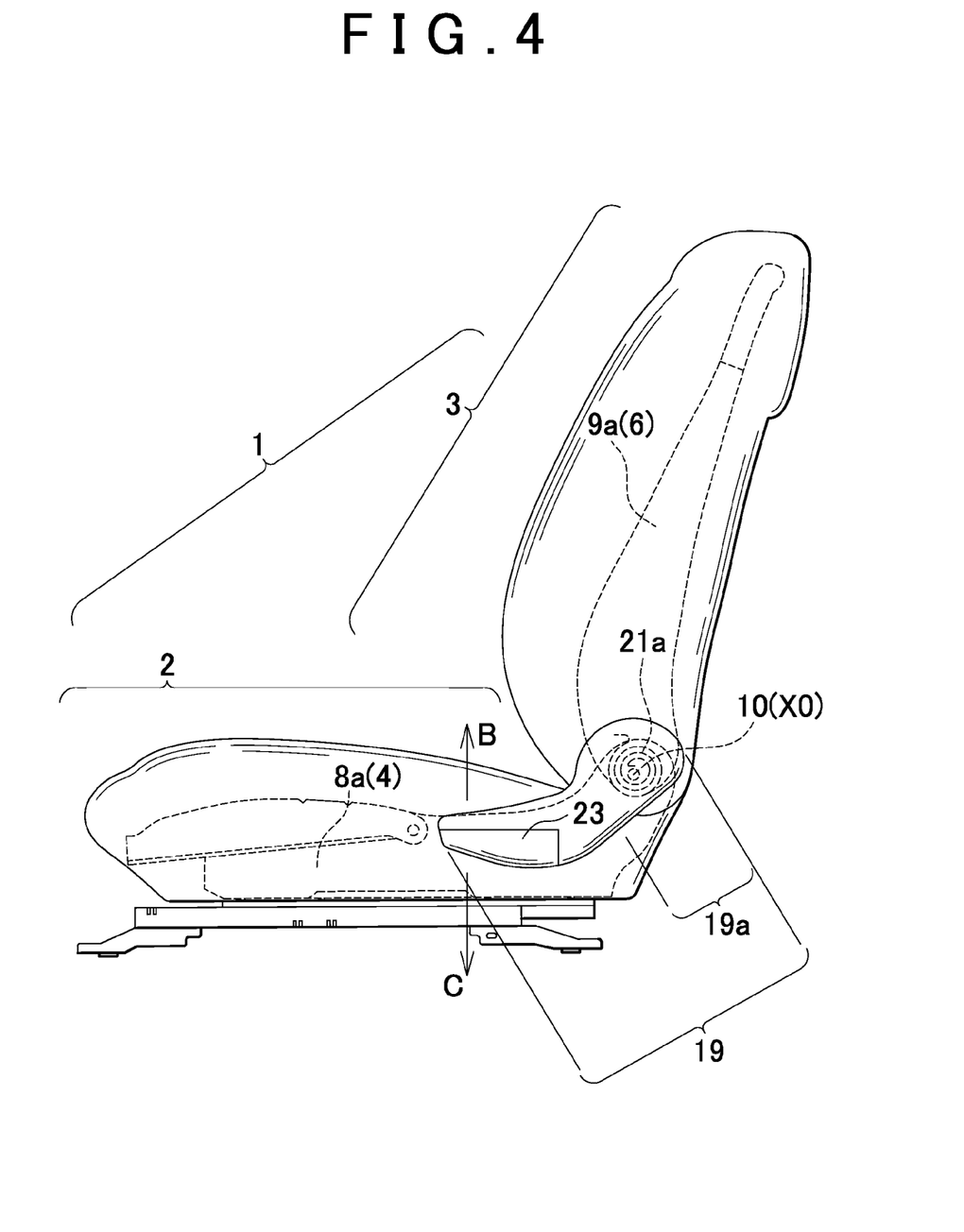
FIG. 4 is a side view showing one side surface portion of the vehicle seat in FIG. 1.

The operation lever 19 is provided on the outside of the seat back 3 and the seat cushion 2 along the side surface of the seat back 3 and the seat cushion 2 as shown in FIGS. 1 and 4. The operation lever 19 extends radially from the center line X0 of the linking rod 10. The operation lever 19 has a grip section 23, which is a portion for the occupant to grip or hook fingers thereon. In FIG. 3, the operation lever 19 is linked to the linking rod 10 by a linking member 24, which is bent to a cross-sectional L-shape. Turning and lifting the operation lever 19 within a predetermined angular range about the linking rod 10 as indicated by arrow B in FIG. 4, or lowering the operation lever 19 as indicated by arrow C, makes it possible to rotate the linking rod 10 about the center line X0 by an amount corresponding to the angle by which the operation lever 19 is turned.

Figure 5:
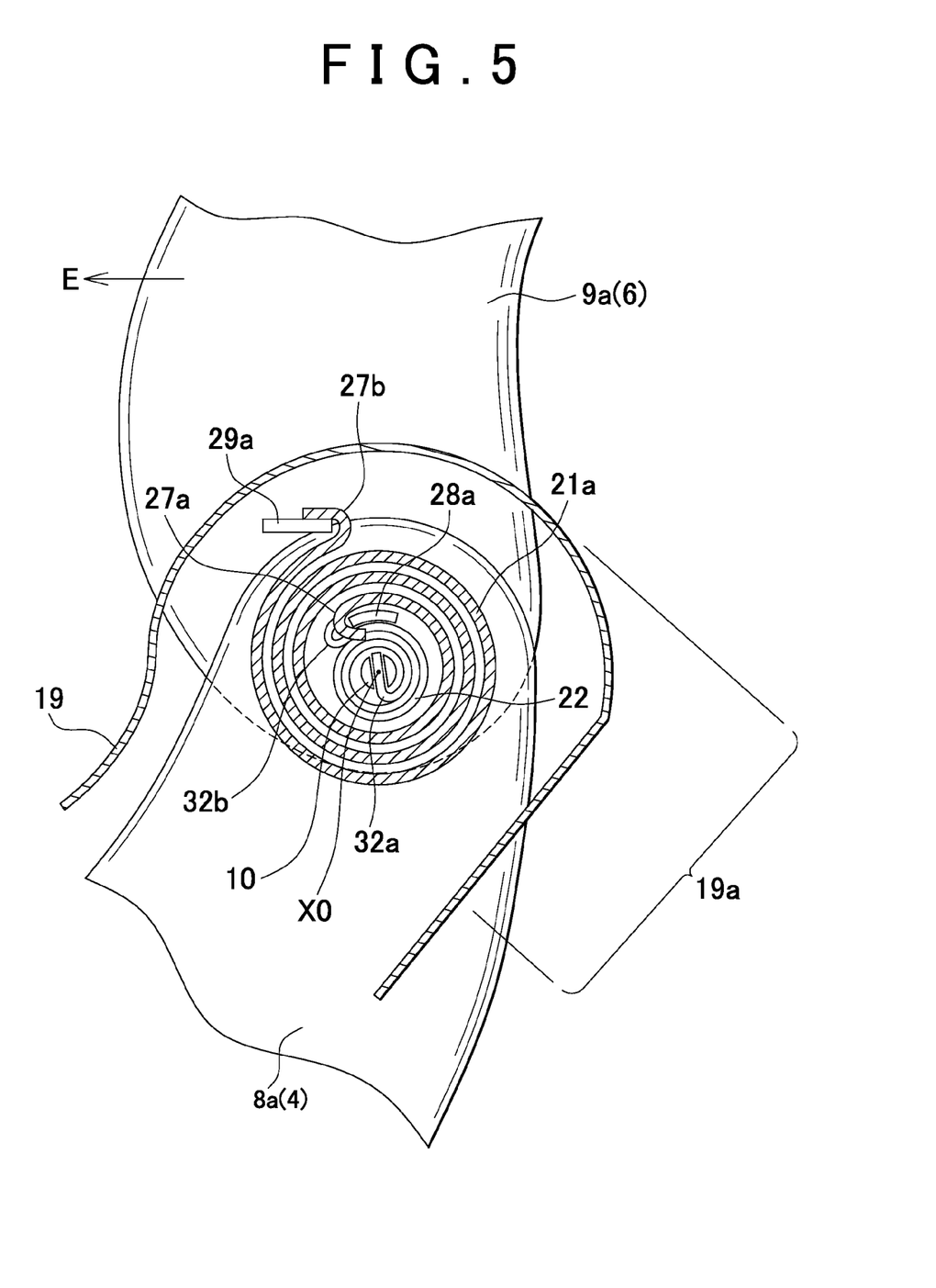
FIG. 5 is a side view taken along the line D-D in FIG. 3.

FIG. 5 is a cross-section view along line D-D in FIG. 3. As shown in FIG. 5, the seat return spring 21a is a spiral spring having an inside end 27a and an outside end 27b. The inside end 27a is fixed to the cushion-side side frame 8a, e.g., to a protruding piece 28a protrudingly provided on the cushion-side side frame 8a in FIG. 3. The outside end 27b of the seat return spring 21a is fixed to the back-side side frame 9a, e.g., to a protruding piece 29a protrudingly provided on the back-side side frame 9a (see FIG. 3). This configuration results in the back-side side frame 9a being urged by a spring force from the seat return spring 21a so as to pivot in the forward direction indicated by arrow E in FIG. 5.

The lever return spring 22 is a spiral spring provided in a space within the seat return spring 21a. The lever return spring 22 has an inside end 32a and an outside end 32b. The inside end 32a is fixed to a distal end of the linking rod 10. The outside end 32b is fixed to the cushion-side side frame 8a, e.g., to the protruding piece 28a protrudingly provided on the cushion-side side frame 8a (see FIG. 3). This configuration urges the linking rod 10 so as to rotate in the direction indicated by arrow C in FIG. 3. This rotation direction is the direction in which the operation lever 19 is lowered in the direction indicated by arrow C in FIG. 4.

In FIG. 3, the locking mechanism 20a is provided, around the linking rod 10, between the back-side side frame 9a (see FIG. 1) and the cushion-side side frame 8a (see FIG. 1). The locking mechanism 20a may assume a locked state or an unlocked state depending on the position of the linking rod 10 in terms of the angle of rotation about the center line X0. The locked state is a state in which the back-side side frame 9a and the cushion-side side frame 8a are integrally linked. The unlocked state is a state in which the frames 9a, 8a are allowed to move freely without being linked. A locking mechanism of such description can be obtained using any desired structure, such as that disclosed in JP-A 2012-126246. In this citation, a locking mechanism is obtained using a structure in which an inner tooth and an outer tooth engage each other.

In a natural state, the locking mechanism 20a is caused to assume a locked state by a spring force (i.e., elastic force) from the lever return spring 22. In other words, the seat back 3 is fixed (i.e., locked) to the seat cushion 2 in the natural state. When a person lifts the operation lever 19 in the direction indicated by arrow B in FIG. 4, and rotates the linking rod 10 by a predetermined angle, against the spring force from the lever return spring 22, as indicated by arrow B in FIG. 3, the locking mechanism 20a is placed in an unlocked state. When the person lets go of the operation lever 19, the operation lever 19 is returned by the spring force from the lever return spring 22 in the direction indicated by arrow C in FIG. 4, and the linking rod 10 rotates as indicated by arrow C in FIG. 3. The locking mechanism 20a is thereby returned to a locked state.

In the present embodiment, the seat return spring 21a, which is a spiral spring, is provided to the outside of both the back-side side frame 9a and the cushion-side side frame 8a. A root portion 19a of the operation lever 19 covers the seat return spring 21a provided on the outside of the frames 8a, 9a as shown in FIGS. 1, 3, and 4. In other words, the seat return spring 21a is covered by the root portion 19a of the operation lever 19 and thereby prevented from being externally exposed. As a result, the risk of a person being struck and injured by the seat return spring 21a is eliminated. In other words, covering the seat return spring 21a using the root portion 19a of the operation lever 19 reduces the hazard presented by the seat return spring 21a and the protruding pieces 28a, 29a, which are projecting members.

Conventionally, the hazard presented by the return spring is reduced by covering the return spring using a dedicated covering member such as a finisher. However, in the present embodiment, instead of using a dedicated finisher, the return spring is covered by the operation lever 19 used for reclining. In other words, the hazard presented by the return spring 21a is reduced by utilizing the operation lever 19 instead of using a dedicated finisher. Thus sharing components makes it possible to reduce cost as well as form a smaller reclining apparatus.

The root portion 19a of the operation lever 19 is, as can be seen from FIGS. 1, 4, and 5, a portion corresponding to the turning center of the operation lever 19, centered around the center line X0 of the linking rod 10. Accordingly, in the present specification, the root portion 19a of the operation lever 19 may be referred to as a turning center portion 19a of the operation lever 19. In the present embodiment, the return spring 21a has a spiral shape, i.e., a substantially circular shape, and the turning center portion 19a of the operation lever 19 covers the outside surface of the return spring 21a. Therefore, the structure covering the return spring 21a is small and stable. The structure being stable refers to it being possible for the operation lever 19 to cover the substantially circular return spring 21a at all times, irrespective of the position of the operation lever 19 in terms of the angle of turn about the center line X0.

As shown in FIG. 3, a projecting piece (i.e., flange) 25 projecting towards the frames 8a, 9a is provided at a portion of the turning center portion 19a of the operation lever 19 facing the frames 8a, 9a. The projecting piece 25 protrudes in an annular shape, i.e., in a ring shape, from the turning center portion 19a of the operation lever 19. The projecting piece 25 is formed so as to be integral with the turning center portion 19a when the operation lever 19 is molded. The projecting piece 25 covers the entire periphery of a side surface of the return spring 21a. The turning center portion 19a of the operation lever 19 covering the outside surface of the return spring 21a and the projecting piece 25 covering the entire periphery of a side surface of the return spring 21a results in the surroundings of the return spring 21a being completely enclosed by the operation lever 19. As a result, the hazard presented by the return spring 21a is significantly reduced.

(Non-Operation-Lever-Side Reclining Mechanism)

The non-operation-lever-side reclining mechanism 16b provided on the opposite side from the operation-lever-side reclining mechanism 16a in FIG. 3 has a locking mechanism 20b which is a reclining device, a seat return spring 21b formed by a spiral spring centered around the linking rod 10, and a cover member 35 for covering the seat return spring 21b. The locking mechanism 20b is a locking mechanism having the same structure and fulfilling the same function as the locking mechanism 20a which is a constituent element of the operation-lever-side reclining mechanism 16a.

Figure 6:
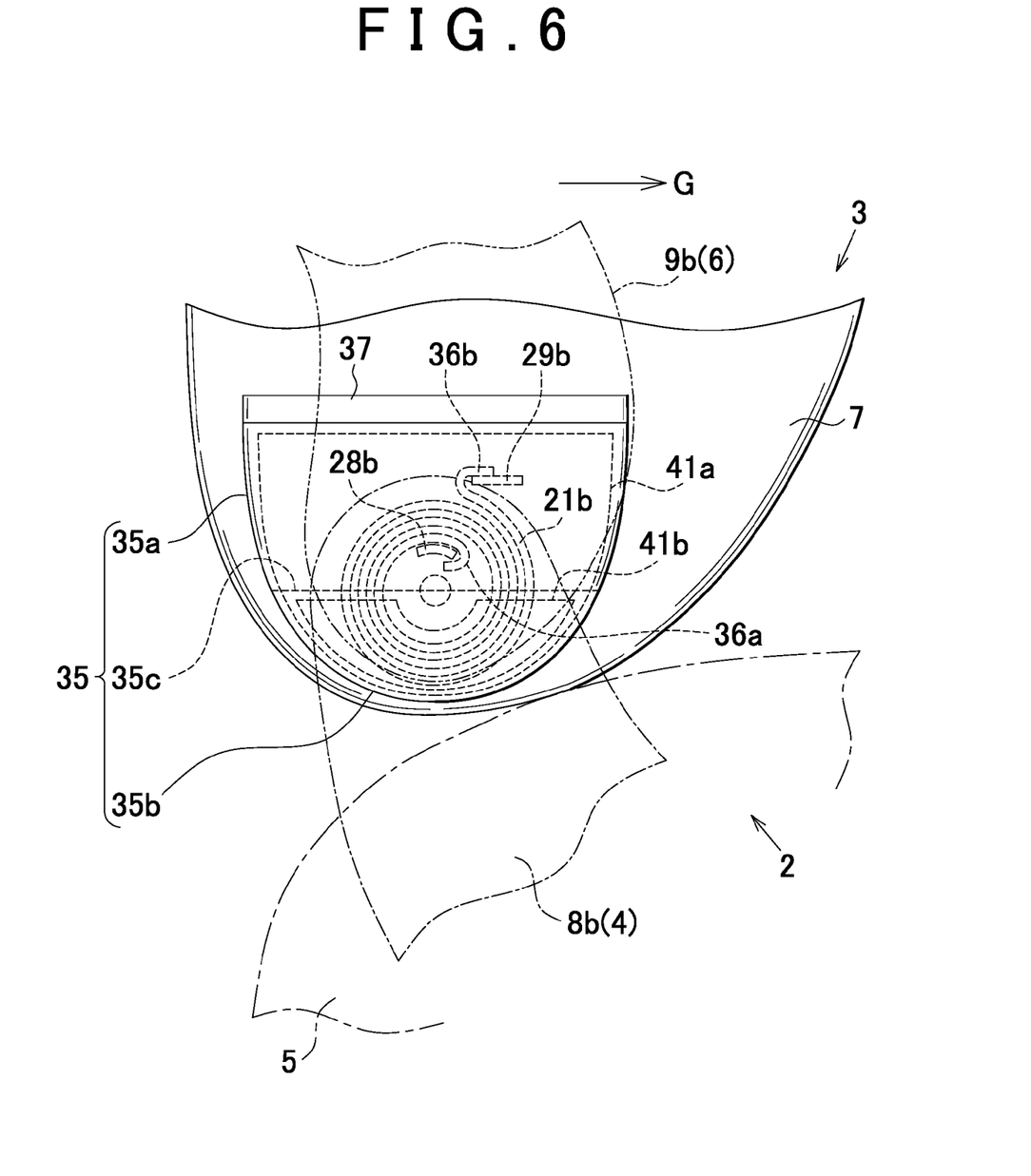
FIG. 6 is a side view showing a portion of one side surface portion of the reclining apparatus taken along arrow F in FIGS. 2 and 3.

FIG. 6 shows a portion at which the seat cushion 2 and the seat back 3 are linked on a side surface of the vehicle seat 1 on the opposite side from the operation lever 19 as viewed along arrow F in FIGS. 2 and 3. As shown in FIG. 6, the seat return spring 21b is a spiral spring having an inside end 36a and an outside end 36b. The inside end 36a is fixed to the cushion-side side frame 8b, e.g., to a protruding piece 28b protrudingly provided on the cushion-side side frame 8b in FIG. 3. The outside end 36b of the seat return spring 21b in FIG. 6 is fixed to the back-side side frame 9b, e.g., to a protruding piece 29b protrudingly provided on the back-side side frame 9b in FIG. 3. This configuration results in the back-side side frame 9b being urged by a spring force from the seat return spring 21b so as to pivot in the forward direction indicated by arrow G in FIG. 6.

In FIG. 3, the locking mechanism 20b is provided, around the linking rod 10, between the back-side side frame 9b and the cushion-side side frame 8b. The locking mechanism 20b may assume a locked state or an unlocked state depending on the position of the linking rod 10 in terms of the angle of rotation about the center line X0 of the linking rod 10. The locked state is a state in which the back-side side frame 9b and the cushion-side side frame 8b are integrally linked. The unlocked state is a state in which the frames 9b, 8b are allowed to move freely without being linked. A locking mechanism of such description can be obtained using any desired structure, such as that disclosed in JP-A 2012-126246. In this citation, a locking mechanism is obtained using a structure in which an inner tooth and an outer tooth engage each other.

In a natural state, the locking mechanism 20b is caused to assume a locked state by a spring force (i.e., elastic force) from the lever return spring 22 in the operation-lever-side reclining mechanism 16a. In other words, the seat back 3 is fixed (i.e., locked) to the seat cushion 2 in the natural state. When a person lifts the operation lever 19 in the direction indicated by arrow B in FIG. 4, and rotates the linking rod 10 by a predetermined angle, against the spring force from the lever return spring 22, as indicated by arrow B in FIG. 3, the locking mechanism 20a is placed in an unlocked state. When the person lets go of the operation lever 19, the operation lever 19 is returned by the spring force from the lever return spring 22 in the direction indicated by arrow C in FIG. 4, and the linking rod 10 rotates as indicated by arrow C in FIG. 3. The locking mechanism 20b is thereby returned to a locked state.

(Cover Member)

In FIG. 3, the seat return spring 21b, which is a spiral spring, is provided on the outside of both the back-side side frame 9b and the cushion-side side frame 8b. The cover member 35 has a main body part 35a covering the outside surface of the seat return spring 21b, a first foldback part 35b which is continuous from the main body part 35a, and a second foldback part 35c which is continuous from the first foldback part 35b. The first foldback part 35b covers a lower part of the side surface of the seat return spring 21b. The second foldback part 35c covers a reverse-side surface of the seat return spring 21b. As shown in FIG. 6, the lower edge of the cover member 35, i.e., a portion corresponding to the first foldback part 35b, has a curved shape, such as a circular arc shape.

As shown in FIG. 3, an inner surface of the first foldback part 35b engages with the lower end portion of the outermost periphery of the seat return spring 21b in a state of contact, whereby the cover member 35 is fixed to the seat return spring 21b.

The cover member 35 is provided so as to extend from the back trim cover 7 in a state of being sewn, at a seam allowance 37 at the upper end part of the cover member 35, to the back trim cover 7. The cover member 35 is formed, e.g., from a fabric, hide, leather, synthetic leather, a cloth, a nonwoven cloth, a textile, or another material. The cover member 35 may be made of the same material as that forming the back trim cover 7, or of a different material. In FIG. 3, the first foldback part 35b and the second foldback part 35c form, together with the main body part 35a, a bag-shaped housing part 38. A portion on the lower side of the seat return spring 21b is housed in the housing part 38.

The method for extending the cover member 35 from the back trim cover 7 is not limited to the sewing method described above. Other possible methods include, e.g., a method in which the cover member 35 is bonded to the trim cover 7 or a method in which the material forming the trim cover 7 is extended so as to function as the cover member 35.

A plate 41a is provided on a surface, of the main body part 35a of the cover member 35, which faces the seat return spring 21b. A plate 41b is provided on a surface, of the second foldback part 35c of the cover member 35, which faces the seat return spring 21b. As shown in FIG. 6, the lower edge of each of the plates 41a, 41b is curved. The plates 41a, 41b are sewn, bonded, or otherwise joined to the main body part 35a and the second foldback part 35c of the cover member 35, respectively. The plates 41a, 41b are formed from a material that is harder than that forming the trim covers 5, 7, such as a resin or a metal. In a case in which a resin is used for the plates 41a, 41b, polypropylene (PP), expanded polypropylene (PP), or the like may be used.

In the present embodiment, the seat return spring 21b, which is a spiral spring, is provided on the outside of both the back-side side frame 9b and the cushion-side side frame 8b. The cover member 35 to which the plates 41a, 41b are affixed covers the seat return spring 21b. In other words, the seat return spring 21b is covered by the cover member 35 and thereby prevented from being externally exposed. As a result, the risk of a person being struck and injured by the seat return spring 21b is eliminated. In other words, covering the seat return spring 21b using the cover member 35 reduces the hazard presented by the seat return spring 21b, which is a projecting member.

Conventionally, the hazard presented by the return spring is reduced by covering the return spring using a dedicated covering member such as a finisher. However, in the present embodiment, instead of using a dedicated finisher, the return spring is covered by the cover member 35 extending from the trim cover 7. In other words, the hazard presented by the return spring 21b is reduced by utilizing the trim cover 7 instead of using a dedicated finisher. Thus sharing components makes it possible to reduce cost as well as form a smaller reclining apparatus.

(Action)

As a result of the vehicle seat 1 and the reclining apparatus 15 of the present embodiment being configured as described above, an occupant seated on the vehicle seat 1 shown in FIGS. 1 and 2 can lift the operation lever 19 shown in FIG. 1 in the direction indicated by arrow B in FIG. 4 and thereby set the locking mechanisms 20a, 20b in FIG. 3 to an unlocked state.

When the locking mechanisms 20a, 20b are put in an unlocked state, the seat back 3 is in a state of being able to freely pivot (i.e., tilt) with respect to the seat cushion 2. In this state, the occupant can place the seat back 3 in a desired tilt angle position. When the occupant lets go of the operation lever 19 in this state, the operation lever 19 is naturally returned to the original position by the spring force from the lever return spring 22 shown in FIGS. 3 and 5, and at the same time, the locking mechanisms 20a, 20b shown in FIG. 3 naturally returns to a locked state and the seat back 3 becomes locked at the desired tilt angle position. The reclining operation is thus completed.

(Operational Effect of Cover Member)

In the present embodiment, in the non-operation-lever-side reclining mechanism 16b shown in FIG. 3, the seat return spring 21b is provided to the outside of both the back-side side frame 9b and the cushion-side side frame 8b. If, instead of the above structure, the seat return spring 21b is disposed on the inside of both of the frames 9b, 8b, when the vehicle in which the occupant is seated on the seat is rear-ended by another vehicle, the amount by which the occupant is pushed into the seat back by an inertial force is restricted due to the obstruction caused by the return spring 21b positioned on the inside of the frames 9b, 8b. In such an instance, there is an increased likelihood of the occupant suffering whiplash.

In contrast, in the present embodiment, the seat return spring 21b is provided on the outside of both the back-side side frame 9b and the cushion-side side frame 8b. Therefore, the seat return spring 21b does not obstruct the occupant from being pushed into the seat back 3. The occupant is thereby allowed to be pushed into the seat back 3 by a significant amount in an instance such as that of a rear-ending by another vehicle, and as a result, is less likely to suffer whiplash.

On the other hand, providing the seat return spring 21b on the outside of both of the back-side side frame 9b and the cushion-side side frame 8b results in the seat return spring 21b projecting significantly from the frame, increasing the likelihood of the return spring 21b striking and injuring a person. In other words, the hazard is increased. However, in the present embodiment, the return spring 21b is covered by the cover member 35, preventing the hazard from increasing.

Although a possible method for preventing the hazard from increasing due to the presence of a projecting member such as the return spring 21b is to cover the projecting member using a finisher formed from a hard member such as plastic, in such a case, the need to use a finisher, which is a dedicated member, may result in an increase in cost of the reclining apparatus or the vehicle seat or an increase in the overall size of the reclining apparatus or the vehicle seat. In contrast, covering the return spring 21b which is a projecting member using a cover member 35 which is a member extending from the trim cover 7 as in the present embodiment makes it possible to prevent the cost from increasing and the size of the device from increasing.

(Structure for Reducing Hazard Presented by Return Spring Using Operation Lever)

In the present embodiment, in the operation-lever-side reclining mechanism 16a shown in FIG. 3, the seat return spring 21a is provided on the outside of both the back-side side frame 9a and the cushion-side side frame 8a. If, instead of the above structure, the seat return spring 21a is disposed on the inside of both of the frames 9a, 8a, when the vehicle in which the occupant is seated on the seat is rear-ended by another vehicle, the amount by which the occupant is pushed into the seat back by an inertial force is restricted due to the obstruction caused by the return spring 21a positioned on the inside of the frames 9a, 8a. In such an instance, there is an increased likelihood of the occupant suffering whiplash.

In contrast, in the present embodiment, the seat return spring 21a is provided on the outside of both the back-side side frame 9a and the cushion-side side frame 8a. Therefore, the space region in the frame is essentially larger, and the seat return spring 21a does not obstruct the occupant from being pushed into the seat back 3. The occupant is thereby allowed to be pushed into the seat back 3 by a significant amount in an instance such as that of a rear-ending by another vehicle, and as a result, is less likely to suffer whiplash.

On the other hand, providing the seat return spring 21a on the outside of both of the back-side side frame 9a and the cushion-side side frame 8a results in the seat return spring 21a projecting significantly from the frame, increasing the likelihood of the return spring 21a striking and injuring a person. In other words, the hazard is increased. However, in the present embodiment, the return spring 21a is covered by the turning center portion 19a of the operation lever 19 and the projecting piece 25 extending therefrom, making it possible to prevent the hazard presented by the return spring 21a from increasing.

Although a possible method for preventing the hazard from increasing due to the presence of a projecting member such as the return spring 21a is to cover the projecting member using a finisher formed from a hard member such as plastic, in such a case, the need to use a finisher, which is a dedicated member, may result in an increase in cost of the reclining apparatus or the vehicle seat or an increase in the overall size of the reclining apparatus or the vehicle seat. In contrast, covering the return spring 21a which is a projecting member through utilizing the operation lever 19 used to switch the reclining apparatus between a locked state and an unlocked state as in the present embodiment makes it possible to prevent the cost from increasing and the size of the device from increasing, contrary to a case in which a dedicated finisher is used.

(Other Embodiments)

The present invention was described above with reference to a preferred embodiment. However, the present invention is not limited to this embodiment, and various modifications are possible within the scope of the invention set forth in the claims.

For example, the shape of the operation lever 19 shown in FIGS. 1 and 4 is only an example, and the shape of the operation lever can be varied as required.

In the above embodiment, in FIG. 3, the outside surface of the return spring 21a is covered by the turning center portion 19a of the operation lever 19. However, if structural circumstances permit, the outside surface of the return spring 21a may be covered by a portion other than the turning center portion 19a of the operation lever 19.

In the above embodiment, in FIG. 3, the outside surface of the return spring 21a is covered by the turning center portion 19a of the operation lever 19, and the side surface of the return spring 21a is covered by the ring-shaped projecting piece 25 projecting from the turning center portion 19a, thereby ensuring that the hazard presented by the return spring 21a is reduced. However, it is also possible to employ a configuration in which only the outside surface of the return spring 21a is covered by the turning center portion 19a without the projecting piece 25 being provided.

(DESCRIPTION OF SYMBOLS)

1. Vehicle seat, 2. Seat cushion, 3. Seat back, 4. Cushion frame, 5. Cushion trim cover (Cushion skin), 6. Back frame, 7. Back trim cover (Back skin), 8a,8b. Cushion-side side frame, 9a,9b. Back-side side frames, 10. Linking rod, 15. Reclining apparatus, 16a. Operation-lever-side reclining mechanism, 16b. Non-operation-lever-side reclining mechanism, 19. Operation lever, 20a,20b. Locking mechanism, 21a,21b. Seat return spring, 22. Lever return spring, 23. Grip section, 24. Linking member, 25. Projecting piece, 27a. Inside end of spiral spring, 27b. Outside end of spiral spring, 28a,28b. Protruding piece, 29a,29b. Protruding piece, 32a. Inside end of spiral spring, 32b. Outside end of spiral spring, 35. Cover member, 35a. Main body part, 35b. First foldback part, 35c. Second foldback part, 36a. Inside end of spiral spring, 36b. Outside end of spiral spring, 37. Seam allowance, 38. Bag-shaped housing part, 41a,41b. Plate

What is claimed is:

1. A vehicle seat comprising
a seat cushion obtained by covering a cushion-side frame with a trim cover,
a seat back obtained by covering a back-side frame with a trim cover, and a reclining apparatus for linking the cushion-side frame and the back-side frame so as to make it possible to adjust the angle of tilt of the seat back with respect to the seat cushion, the reclining apparatus comprising:
a return spring provided on an outside of the cushion-side frame and the back-side frame and adapted to urge the seat back in a forward-tilting direction;
a locking mechanism capable of assuming a locked state in which the relative positions of the cushion-side frame and the back-side frame are locked and an unlocked state in which the back-side frame is capable of freely pivoting with respect to the cushion-side frame;
an operation lever for switching the state of the locking mechanism between the locked state and the unlocked state, the operation lever comprising a grip section and a turning center portion integrated with the grip section;
an outside surface of the return spring is covered by the turning center portion of the operation lever, and
wherein a distance between the locking mechanism and a center of the seat cushion is less than a distance between the return spring and the center of the seat cushion.

2. The vehicle seat according to claim 1, wherein the turning center portion and the grip section operate as a single unit.

3. The vehicle seat according to claim 1, wherein the return spring is not exposed to an outside of the operation lever.

4. The vehicle seat according to claim 1, wherein the operation lever includes a solid outer surface.

5. The vehicle seat according to claim 1, wherein the operation lever is formed by molding.

6. The vehicle seat according to claim 1, wherein:
the vehicle seat comprises a linking rod for pivotally supporting each of the cushion-side frame and the back-side frame;
the return spring comprises a spiral spring shaped as a spiral around a center line of the linking rod;
the operation lever comprises a lever extending radially from the center line of the linking rod and comprises a lever that turns within a predetermined angular range about the center line; and
the operation lever covers the outside surface of the return spring with the turning center portion of the operation lever itself, the turning center portion being centered around the center line.

7. The vehicle seat according to claim 1, wherein an inside end of the return spring is fixed to a protruding piece projecting outwards from the cushion-side frame, and an outside end of the return spring is fixed to a protruding piece projecting outwards from the back-side frame.

8. The vehicle seat according to claim 1, wherein the return spring is mounted outside the locking mechanism.

9. The vehicle seat according to claim 1, wherein the grip section and the turning center portion comprise a single element.

10. The vehicle seat according to claim 1, wherein the return spring and the locking mechanism are mounted on opposite sides of the trim cover of the seat cushion.

11. The vehicle seat according to claim 1, wherein, when the operation lever is operated, the grip section and the turning center portion rotate together.

12. The vehicle seat according to claim 1, wherein the trim cover of the seat cushion is disposed between the return spring and the locking mechanism.

13. The vehicle seat according to claim 1, wherein the return spring is mounted outside of the seat cushion, and
wherein the locking mechanism is mounted inside of the seat back, the locking mechanism and the return spring being synchronized.

14. The vehicle seat according to claim 1, wherein the operation lever comprises a portion covering a side surface of the return spring.

15. The vehicle seat according to claim 14, wherein:
the vehicle seat comprises a linking rod for pivotally supporting each of the cushion-side frame and the back-side frame;
the return spring comprises a spiral spring shaped as a spiral around a center line of the linking rod;
the operation lever comprises a lever extending radially from the center line of the linking rod and comprises a lever that turns within a predetermined angular range about the center line; and
the operation lever covers the outside surface of the return spring with the turning center portion of the operation lever itself, the turning center portion being centered around the center line.

16. The vehicle seat according to claim 15, wherein the portion of the operation lever covering the side surface of the return spring comprises a ring-shaped projecting piece enclosing the center line of the linking rod.

17. The vehicle seat according to claim 16, wherein an inside end of the return spring is fixed to a protruding piece projecting outwards from the cushion-side frame, and an outside end of the return spring is fixed to a protruding piece projecting outwards from the back-side frame.

* * * * *